July 5, 1938.　　　　　E. J. FARKAS　　　　　2,123,004
PEDAL SLOT CLOSURE
Filed May 13, 1937
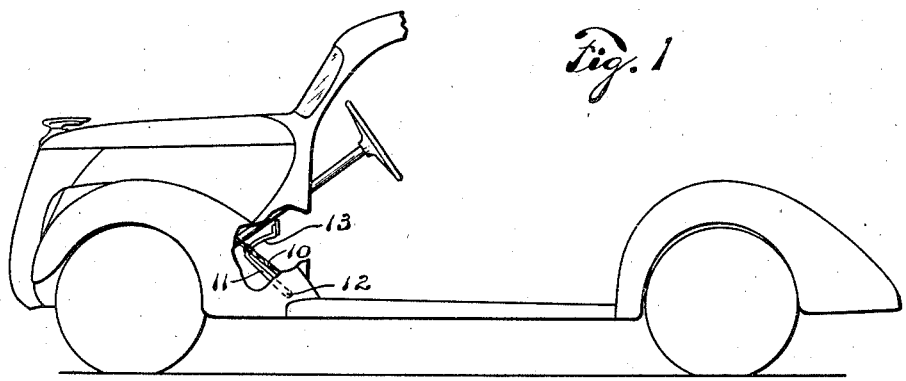
Fig. 1
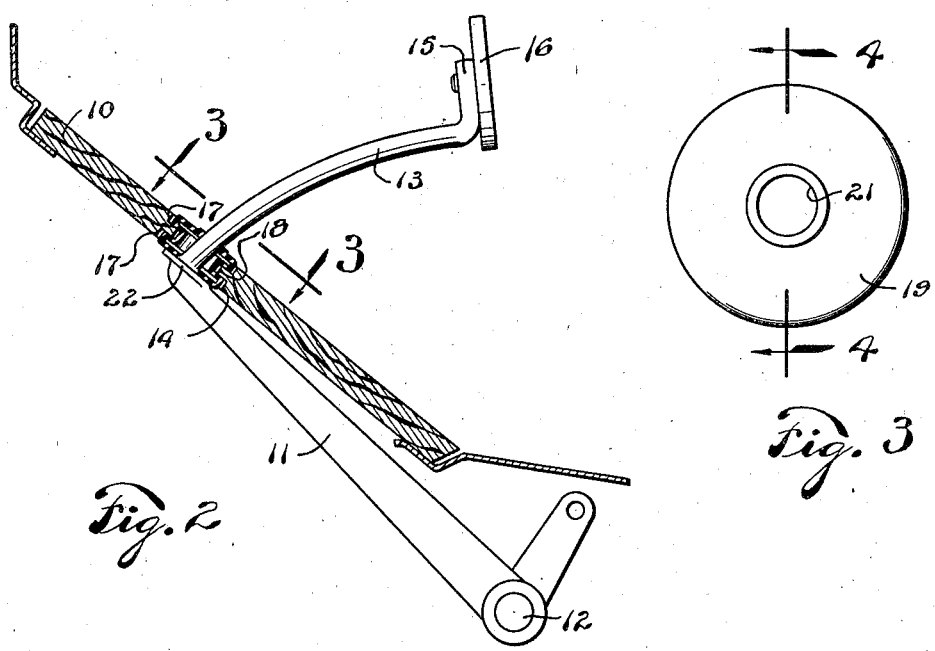
Fig. 2
Fig. 3
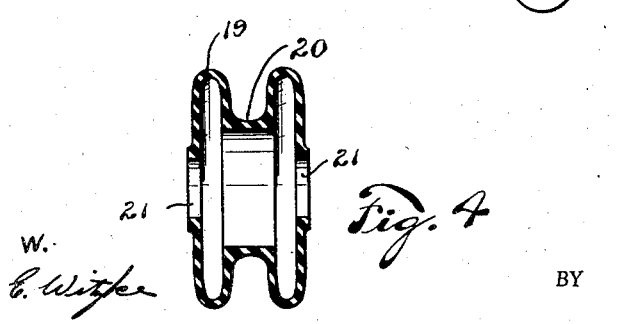
Fig. 4
W.
E. Witzke
INVENTOR.
E. J. Farkas.
BY Edwin C. McRae
ATTORNEY.

Patented July 5, 1938

2,123,004

UNITED STATES PATENT OFFICE 2,123,004

PEDAL SLOT CLOSURE

Eugene J. Farkas, Detroit, Mich., assignor to Ford Motor Company, Dearborn, Mich., a corporation of Delaware Application May 13, 1937, Serial No. 142,372

4 Claims. (Cl. 180—90.6)

The object of my invention is to provide a pedal slot closure for sealing the space between the control pedals of a motor vehicle and the floor boards thereof.

A further object of my invention is to provide a pedal slot closure which will allow the pedal shank to move freely therethrough, while still forming a relatively airtight joint between the pedal shank and the floor boards.

Still a further object of my invention is to provide a pedal slot closure which will allow a relatively large lateral movement between the pedal and the floor board without causing binding therebetween. This feature is of particular importance in automobiles wherein there is often considerable lateral misalignment between the pedal slot openings and the pedal shanks. The pedals are usually supported upon the frame of the vehicle while the pedal slot openings are formed in the floor boards of the body of the vehicle. Rubber cushions usually are provided for supporting the body upon the frame, which accounts to a large extent for the ordinary misalignment between the openings and the pedal shanks. The above-mentioned misalignment is usually about an eight of an inch, but with all pedal slot closure devices known to the applicant, a misalignment of such an extent invariably causes considerable binding between the closure device and the pedal shank. To overcome this binding action a much heavier return spring pressure is needed on the pedal which, of course, requires that more pressure be applied to operate the pedal.

The above-mentioned misalignment does not occur in all cars, in fact, only a small percentage having such a condition. Nevertheless, all automobiles made by mass production methods must have similar parts so that the pedal return springs must be sufficiently heavy on all the cars to return the pedal against the maximum drag produced in only a few of their number. The object of my invention is, therefore, to provide a pedal slot closure which will present a minimum of sliding resistance to the pedal shank, even in those cases where an appreciable misalignment occurs.

Still a further object of my invention is to provide a pedal slot closure which will be comparatively easy to assemble in a motor vehicle.

With these and other objects in view my invention consists in the arrangement, construction and combination of the various parts of my improved device, as described in the specification, claimed in my claims, and illustrated in the accompanying drawing, in which:

Figure 1 is a diagrammatic side elevation of an automobile, a portion thereof being broken away to better illustrate the position of the pedals and my improved closure.

Figure 2 shows a central vertical sectional view through the floor boards of the car and pedal slot closure shown in Figure 1, illustrating in detail the construction employed.

Figure 3 shows a sectional view, taken on the line 3—3 of Figure 2, and

Figure 4 shows a sectional view, taken on the line 4—4 of Figure 3.

Referring to the accompanying drawing, I have used the reference numeral 10 to indicate the floor boards of a motor vehicle. A pedal arm 11 is positioned beneath the floor boards 10, and is pivotally mounted at 12 in the conventional manner. The pedal arm 11 may be used as either the brake or clutch pedal. A pedal shank 13 of circular section is formed integrally with the outer end of the arm 11 and extends upwardly through an annular opening 14 in the floor boards 10. The shank 13 is bent to an arcuate shape to coincide with an arc described around the center 12 and is located substantially at the center of the opening 14. The upper end of the shank 13 is provided with a head 15 which is tapped to receive a pedal pad 16 in the conventional manner. The opening 14 is of sufficient diameter that the floor boards may be assembled over the head 15.

It will be noted from Figure 2 that countersunk recesses 17 are provided in both upper and lower faces of the floor board 10, respectively, and in axial alignment with the opening 14. This construction leaves an annular tongue 18 surrounding the pedal shank, the inner edge of the annular tongue defining the opening 14.

To form the closure for the space between the shank 13 and the opening 14, I have provided an annular bellows 19 formed of resilient rubber which is constructed with two folds. The member 19 has been termed a bellows only because of its appearance and not because it functions as such. In fact, the member 19 does not function as a bellows, the folds serving only to hold the member in place. The reduced portion 20 at the center of the bellows is of such diameter that it fits within the opening 14, while the outside diameter of the folds is such that they fit within the counterbore recesses 17. Both ends of the bellows are provided with openings 21 just slightly larger than the diameter of the shank 13.

In assembling the device, the bellows is stretched so that the head 15 is inserted through the openings 21 to thereby allow the bellows to slide upon the shank 13. The bellows is formed of quite thin and resilient rubber so that the lower fold thereof may be pushed through the opening 14 of the floor boards. This lower fold then expands to position in the lower counterbore 17, while the upper fold expands to position in the upper counterbore. The pedal shank 13 may then be reciprocated through the openings 21. If there is any misalignment between the opening 14 and the shank 13, the folds of the bellows distort slightly to permit reciprocation of shank 13 without an appreciable drag.

It will be noted that an annular base 22 is formed at the intersection of the arm 11 and the shank 13, in position perpendicular to the shank 13. The base 22 has sufficient diameter that when the pedal is in its uppermost position, as shown in Figure 2, the base bears against the lower end of the bellows and presses same into the lower counterbore. This squeezes the lower fold of the bellows between the base 22 and the annular tongue 18 to form a comparatively positive stop for the pedal in its uppermost position. The base member 22, of course, forms an airtight seal with the tongue 18 independently of the closeness of the joint between the shank 13 and the openings 21.

Among the many advantages arising from the use of my improved pedal slot closure, it may be well to mention that considerable misalignment may be allowed between the shank 13 and the opening 14 and still little extra resistance is encountered, due to this condition. The pedal return spring may thereby be of minimum tension. Still a further advantage of my construction is that the device is comparatively inexpensive to manufacture and may conveniently be assembled without the use of tools or the like.

Some changes may be made in the arrangement, construction and combination of the various parts of my improved device, without departing from the spirit of my invention, and it is my intention to cover by my claims, such changes as may reasonably be included in the scope thereof.

I claim as my invention:

1. A device forming a closure between the shank of a control pedal and the floor boards of a motor vehicle comprising, a two-fold bellows formed of resilient rubber, each end of said bellows having an opening therein through which said shank extends and which forms a sliding fit with said pedal shank, the portion of said bellows between said folds being considerably larger than said shank and substantially the same diameter as the opening in the floor boards through which said shank extends, said bellows being held in position by the folds thereof which are disposed on opposite sides of said floor boards.

2. A device for forming a closure around the shank of a control pedal of a motor vehicle, said pedal being supported with said shank extending circumferentially relative to the pivot axis thereof and with said shank projecting perpendicularly through an opening in said floor boards, said opening being materially larger than said shank, and said floor boards having a counterbore formed in each side thereof in position axially aligned with said opening, said closure device comprising, a two-fold circular bellows formed of flexible rubber having an outside diameter the same as said counterbore and a diameter between said folds, the same as that of said floor board opening, and the ends of said bellows each having an opening therein the same diameter as of said pedal shank, said bellows being assembled through said opening with its folds disposed in the respective counterbores and with said shank extending through said end openings.

3. A device for forming a closure around the shank of a control pedal of a motor vehicle, said control pedal having an arm extending radially from the pivot axis thereof with an arcuate shank portion extending circumferentially from the outer end of said arm and with a head formed on the outer end of said shank portion, said pedal being mounted in the vehicle with said shank extending perpendicularly through an annular opening in the floor boards of the vehicle, said opening being of sufficient size to permit said head to be inserted therethrough, counterbores formed in each side of said floor boards in axial alignment of said opening, and a two-fold bellows formed of resilient rubber, the outside diameter of which is substantially the same diameter as said counterbores and the intermediate portion of which is substantially the same diameter as said floor board opening, said bellows having an opening in each end thereof substantially the same diameter as said pedal shank, said bellows being assembled to said floor board with the folds thereof positioned in said respective counterbores and with said pedal shank extending through said end openings.

4. A device for forming a closure around the shank of a control pedal of a motor vehicle, said pedal having an arm extending radially from the pivotal axis thereof, with an arcuately extending shank projecting upwardly through an opening in the floor boards, a face formed at the intersection of said shank and arm in position perpendicular to said shank, said floor board opening being materially larger than the diameter of said shank but slightly smaller than the diameter of said face, a two-fold annular bellows formed of resilient rubber having a diameter between said folds substantially the same as the diameter of said floor board opening, the ends of said bellows each having an opening therein adapted to fit said pedal shank, said bellows being assembled in the floor board with one fold on each side thereof, and with said shank extending through said end openings, said pedal when inoperative being positioned so that said face bears against the adjacent fold of said bellows and presses same against said floor boards to thereby form a closure for said pedal independently of the closeness of the fit between said pedal shank and the openings in the ends of said bellows.

EUGENE J. FARKAS.